(12) United States Patent
Popov

(10) Patent No.: US 12,014,020 B2
(45) Date of Patent: Jun. 18, 2024

(54) SELF-ACTIVATING PROGRESSIVE-OFFSET CURSOR FOR PRECISE FINGER SELECTION ON TOUCH DEVICES

(71) Applicant: Dassault Systemes SolidWorks Corporation, Waltham, MA (US)

(72) Inventor: Chavdar Popov, Cambridge (GB)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 0 days.

(21) Appl. No.: 16/926,860

(22) Filed: Jul. 13, 2020

(65) Prior Publication Data

US 2022/0011921 A1    Jan. 13, 2022

(51) Int. Cl.
*G06F 3/04812* (2022.01)
*G06F 3/0488* (2022.01)

(52) U.S. Cl.
CPC ........ *G06F 3/04812* (2013.01); *G06F 3/0488* (2013.01)

(58) Field of Classification Search
CPC ............................ G06F 3/0488; G06F 3/04812
See application file for complete search history.

(56) References Cited

U.S. PATENT DOCUMENTS

| | | |
|---|---|---|
| 7,304,638 B2 | 12/2007 | Murphy |
| 8,531,410 B2 | 9/2013 | Roth et al. |
| 8,749,494 B1 * | 6/2014 | Delker ................. G06F 3/0488 345/173 |
| 9,250,730 B2 | 2/2016 | Au et al. |
| 9,678,639 B2 | 6/2017 | East et al. |
| 2006/0244735 A1 * | 11/2006 | Wilson ................. G06F 3/0488 345/173 |
| 2007/0097096 A1 * | 5/2007 | Rosenberg ............ G06F 1/1626 345/173 |
| 2009/0044124 A1 | 2/2009 | Pihlaja |
| 2010/0295780 A1 | 11/2010 | Vaisanen et al. |

(Continued)

FOREIGN PATENT DOCUMENTS

WO    2008/030880 A1    3/2008

OTHER PUBLICATIONS

Bohme, "Overcoming Occlusion-Problems on Touch Screens," Media Informatics Proseminar, 2015, 4 pages.

(Continued)

*Primary Examiner* — Nelson M Rosario
*Assistant Examiner* — Scott Au
(74) *Attorney, Agent, or Firm* — Hamilton, Brook, Smith & Reynolds, P.C.

(57) ABSTRACT

Embodiments relate to methods and systems for rendering display of a cursor at a progressive offset that is a function of distance traveled from an initial point of contact on a touch screen. One such example embodiment, first, identifies contact with a screen of a touch screen device. Next, movement of the identified contact through a succession of positions on the screen is detected. Then, in response to detecting the movement of the identified contact, display of a cursor is rendered in a graphical user interface (GUI) on the screen of the touch screen device at an offset distance away from current position of the contact where, the offset distance is proportional to length traveled of the detected movement.

11 Claims, 10 Drawing Sheets

(56) References Cited

U.S. PATENT DOCUMENTS

2011/0043453 A1  2/2011  Roth et al.
2011/0239153 A1  9/2011  Carter et al.
2013/0086503 A1  4/2013  Kotowski

OTHER PUBLICATIONS

Vogel et al., "Shift: A Technique for Operating Pen-Based Interfaces Using Touch," CHI 2007, Apr. 28-May 3, 2007, 10 pages.
Vogel et al., "Occlusion-Aware Interfaces," CHI 2010: Interfaces and Visualization, Apr. 10-15, 2010, Atlanta, Georgia, pp. 263-272.
Screen shot from "Color Hole," retrieved Jul. 8, 2020.

* cited by examiner

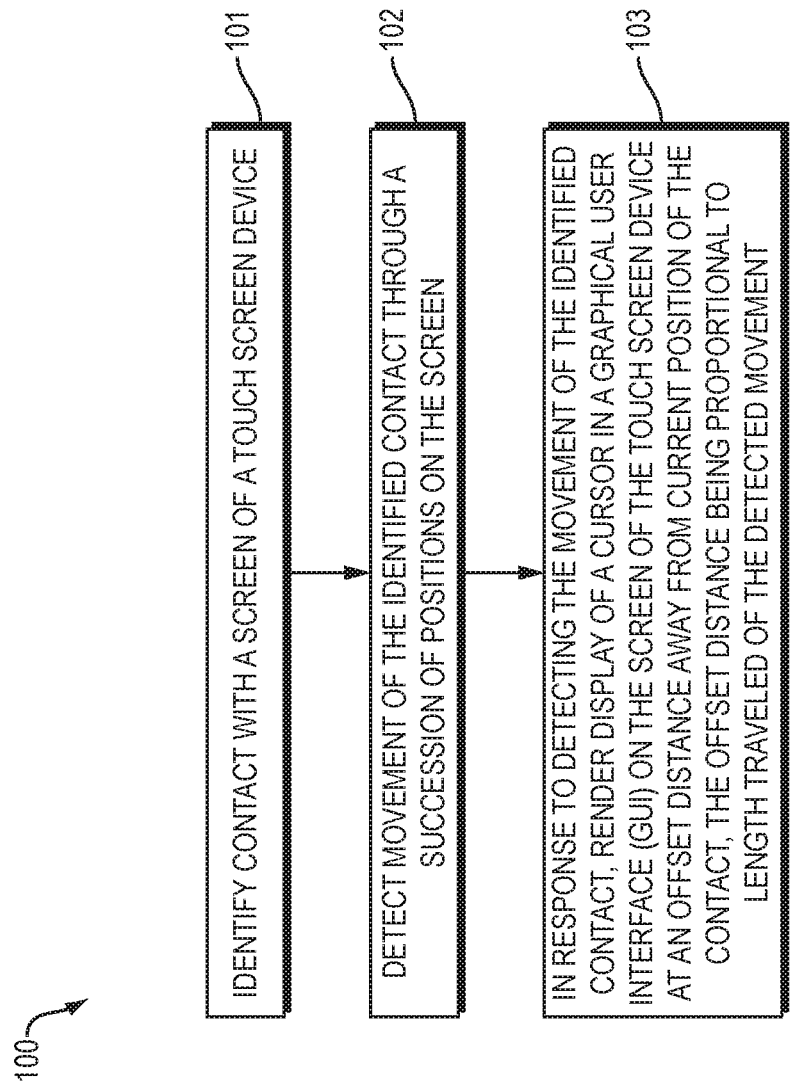

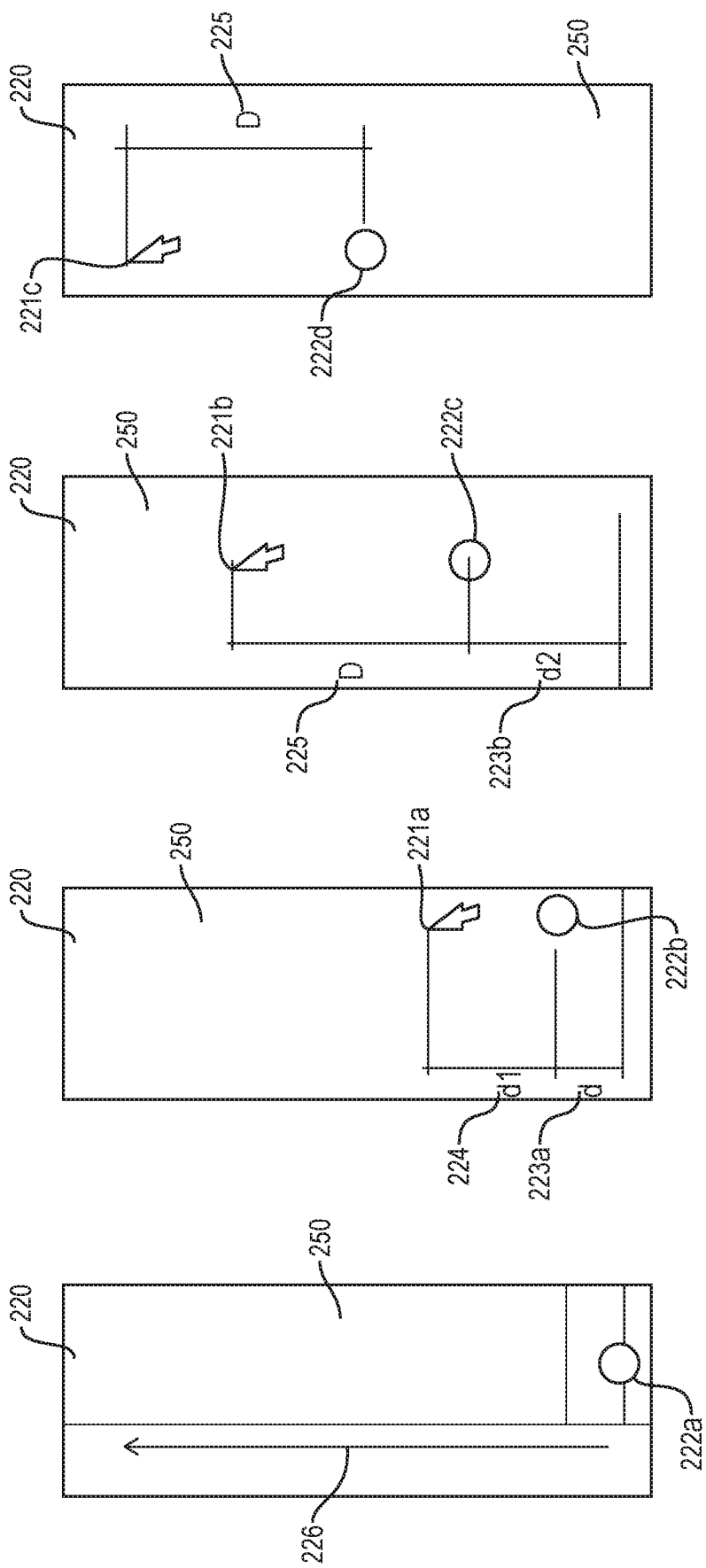

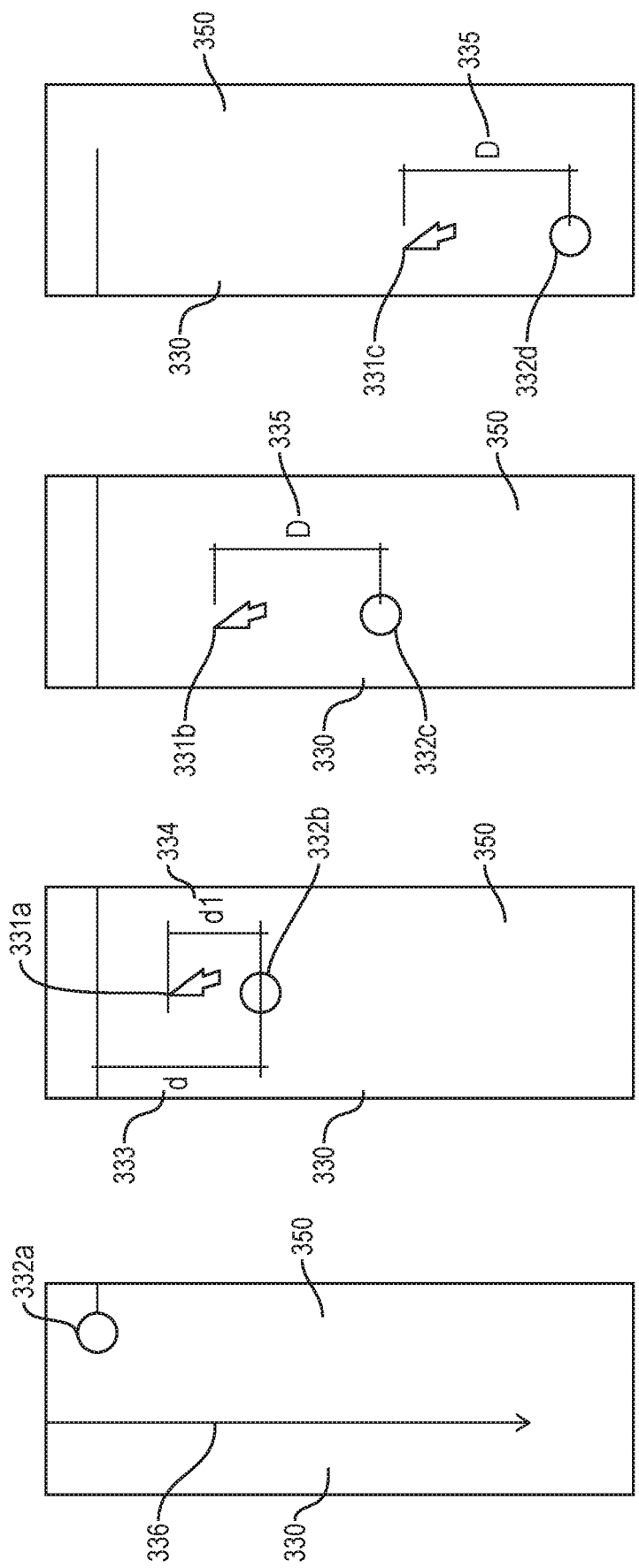

SELF-ACTIVATING PROGRESSIVE-OFFSET CURSOR FOR PRECISE FINGER SELECTION ON TOUCH DEVICES

BACKGROUND

Touch devices, i.e., touch screen based devices, are ubiquitous. Likewise, the use of touch devices for performing computer operations and operating software programs and interfaces is widespread.

SUMMARY

While touch screen based computer operation has become widespread, touch screen interaction can benefit from improved precision and accuracy. Embodiments provide such improvements.

Embodiments of the present invention improve touch screen interaction by providing a self-activating progressive offset cursor that results in a seamless user experience. One such embodiment is directed to a computer implemented method for rendering and displaying such a cursor. The method identifies contact with a screen of a touch screen device. Then, movement of the identified contact through a succession of positions on the screen is identified. In turn, in response to detecting the movement of the identified contact, display of a cursor is rendered in a graphical user interface (GUI) on the screen of the touch screen device at an offset distance away from current position of the contact. In such an embodiment, the offset distance is proportional to length traveled of the detected movement. Notably, the embodiment renders the offset cursor automatically and free of specific command (e.g., selection of cursor mode, and the like) by the user. Hence the rendering of the cursor at an offset is self-activating in embodiments.

According to an embodiment, rendering display of the cursor in the GUI comprises continuously displaying the cursor throughout the detected movement. In another embodiment, rendering display of the cursor in the GUI includes continuously calculating a distance traveled throughout the movement from an identified point of initial contact and continuously displaying the cursor throughout the detected movement. In such an embodiment the offset distance is a function of the continuously calculated distance traveled. Further, in yet another embodiment, the offset distance is a function of the continuously calculated distance until the offset distance is equal to an offset distance threshold (also referred to as an offset distance cap, or maximum).

In embodiments, in the plane of the screen view, the method or corresponding system displays the cursor at a location relatively above the position of the identified contact from the perspective of a user performing the contact. The method/system determines display location for the cursor as a function of, or in relation to, both: (a) current position of the contact, and (b) one or more physical characteristics of the detected movement. In particular, the method/system displays the cursor at a location defined by: (i) the calculated offset distance away from the contact, and (ii) the direction of the detected movement. In embodiments, the cursor can be configured to perform any operations known in the art, such as selection and drawing. As such, in an embodiment, the cursor can be used to perform any cursor operations known in the art.

Yet another embodiment is directed to a system that includes a processor and a memory with computer code instructions stored thereon. In such an embodiment, the processor and the memory, with the computer code instructions, are configured to cause the system to implement any embodiments or combination of embodiments described herein.

Another embodiment is directed to a cloud computing implementation for displaying a cursor. Such an embodiment is directed to a computer program product executed by a server in communication across a network with one or more clients, where the computer program product comprises instructions which, when executed by a processor, causes the processor to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1 is a flowchart of a method for displaying a cursor according to an embodiment.

FIGS. 2A-D depict results of a method of rendering display of a cursor according to an embodiment.

FIGS. 3A-D illustrate displaying an offset cursor in an embodiment.

DETAILED DESCRIPTION

Figure 4A:
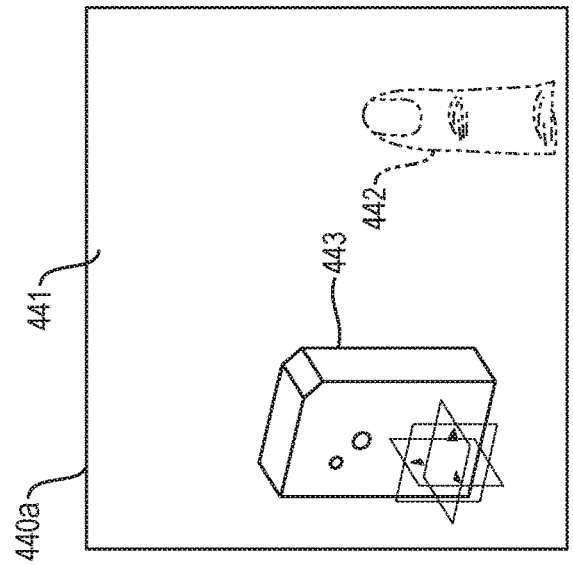
FIGS. 4A-C are schematic views that illustrate stages of displaying a cursor in an embodiment as a contact implement moves upwardly along the surface of a touch screen device.

A description of example embodiments follows.

On touch screen devices, performing operations with an implement, e.g., selection of a graphical object with a finger or stylus, is hampered by the fact that the implement used for selection, e.g., finger, obscures the view of the very object or objects on which the user is trying to perform an operation, e.g., select or snap to. To mitigate these problems, larger selection tolerances can be used. For example, if a circular object being selected has an area of 1 square cm, the selection tolerance for that object can be increased such that touching anywhere in a 1.5 square cm area surrounding the circular object may be considered a selection of the circular object. However, using larger selection tolerances is problematic. Using larger tolerances slows down the search for the nearest object and constant zoom in/outs generally must be made to perform precise selections. For instance, if a user wants to select a very small object that is part of a large assembly, selecting the small object requires (1) zooming in on the very small object so only the small object is shown on the screen, (2) selecting the object, and (3) zooming out so the entire assembly is once again visible. Further, in touch screen based computer operations, the view of the selected object is obscured by the implement used for selecting, e.g., finger, and the selected object can be seen only after the implement (finger) has moved, requiring a cancel/repeat selection sequence.

In theory, offset cursors (shown away from the finger) may be employed to implement selecting objects as the cursor slides over the object of interest. However, on touch screen devices, there is no cursor shown without the user first touching the screen. As such, one cannot predict where such an offset cursor would randomly pop up. Also, a sudden "cursor jump," which occurs when an offset cursor appears upon placing a finger upon the touch screen, is undesirable. In addition, an offset cursor is not always required. For example, a user can select large objects, buttons, and icons, etc. without the need for an offset cursor. If an offset cursor is always displayed, a user would place his finger upon a large object and then, generally, must move his finger so that the offset cursor is on the large object for selection. This is undesirable because the sequence of steps requires the user to make additional movements on the screen, even when selecting large items that could otherwise be selectable with a single screen tap. Another option to improve touch screen interaction is to employ an offset cursor that is toggled on and off by the user (i.e., upon user command). However, such an offset cursor is also undesirable and impractical because the user must activate it or otherwise operate its on/off mode during general use. This too slows down operations and degrades ergonomics.

Embodiments of the present invention solve the foregoing problems and disadvantages in the art. Specifically, embodiments provide an offset cursor that automatically appears gradually from under the implement performing the operation, e.g., finger, in a natural and self-activating (command interface-less) manner, without requiring the user to turn on/off the offset cursor functionality (i.e., free of user specific command thereof). In an embodiment, the cursor offset appears in an elastic way, initially retarding or speeding up (and correspondingly shortening or lengthening offset distance) with the finger/implement movement until, at some point, the offset becomes fixed and the cursor starts to move together with the finger/implement. In this way, embodiments provide functionality where the cursor is continuously visible (i.e., the view of the cursor is maintained unobstructed) and provides feedback until the user chooses to release and make a selection of graphic or other displayed components.

In an example workflow, the user simply slides her finger on the screen surface of the touch screen device, and in response, the offset cursor pops out (or is otherwise automatically rendered and presented) seamlessly from under the finger. The user then proceeds to: drag the displayed offset cursor over objects or areas in the screen view, highlight objects, and select objects as if using a traditional cursor control device, such as a mouse. In an example embodiment, the offset cursor appears above the position of the finger in the plane of the screen view, though this is not exclusive, and in other embodiments, the offset cursor may be implemented to appear below or to the side of the selection implement position depending on the direction of movement of the selection tool, e.g., finger, stylus, or other implement.

According to an embodiment, upon a user's finger/implement contacting the touchscreen, the cursor is deemed to be under the finger/implement, and crucially the user can optionally release contact and select the object without having to slide her finger/implement to show the offset cursor. No user control interface is required to switch the offset cursor on or off or to otherwise activate the offset cursor in the moment of use. After contacting the touch screen, the embodiment displays the offset cursor gradually appearing when the user slides her finger on the screen surface. The user can release contact (such as to make a selection) at any desired point, including during the initial 'elastic' stage while the offset distance is still increasing. This advantageously allows a user to select larger elements with a single motion, e.g., a tap on the touchscreen/screen surface.

Embodiments thus provide significant improvements over existing touch screen interaction methodologies. For example, in the prior art if the offset cursor is always used, then the user would intuitively place his finger on a displayed large object to select said object, but, because of the always on offset, the cursor would actually not appear displayed on the object. As a result, the user would have to slide his finger on the touch screen until the permanent (always on) offset cursor is displayed positioned on the object the user wishes to select. In contrast, embodiments of the present invention provide an elastic offset cursor that is under the user's finger (i.e., the cursor's position is coincident with position of the finger in the plane of the screen view) upon initial contact with the touch screen. In turn, the elastic offset cursor appears further away from the position corresponding to screen contact of the finger when the finger moves along the surface of the touch screen, and thus the user can (is enabled to) select large objects without having to make additional movements.

Similarly, in prior art methods where an offset cursor must be user-selectably turned on and off, the user has to turn off the offset cursor before selecting a large object and, then, turn the offset cursor back on to select smaller objects. Such a procedure is cumbersome and degrades ergonomics. Embodiments of the present invention solve these problems and overcome the associated disadvantages by implementing an elastic cursor that: (i) is initially displayed on the screen of the touch screen device at a position coincident with the point of finger contact, and thus appears under the finger upon initial contact, and, then, (ii) is eventually displayed at an offset distance away from the point of contact, i.e., position corresponding to the finger, at an offset distance that is proportional to length traveled of a detected movement (change in positions) of the finger in contact with the screen surface.

FIG. 1 is a flowchart of a method 100 for displaying a cursor according to an embodiment. The method 100 starts by identifying 101 contact with the surface of the screen of a touch screen device. To illustrate, the contact identified at step 101 may be a user placing her finger on the touch screen. The identified contact may be made by a finger, a stylus, or any other implement used to operate a touch screen device. Moreover, in an embodiment, the contact may be identified 101 using methods known on the art.

The method 100 continues and detects 102 movement of the identified contact through a succession of positions on the screen. In other words, at step 102, movement of the contact along the surface of the touch screen is identified, which includes the various positions of the contact when performing the movement. Returning to the aforementioned finger example, detecting 102 the movement may include identifying the multiple locations along a movement path, i.e., trajectory, taken by the finger on a touch screen. Further, in an embodiment, the movement may be detected 102 using principles known in the art.

To continue, in response to detecting 102 the movement of the identified contact, display of a cursor is rendered 103 in a graphical user interface (GUI) on the screen of the touch screen device at an offset distance away from a current position of the contact. In such an embodiment, the offset distance is proportional to length traveled of the detected 102 movement.

To illustrate, consider the aforementioned finger example. In this example, the initial contact of the finger touching the touch screen is identified 101. Next, the method 100 detects 102 that the finger moved 2 inches vertically along the surface of the touch screen. In turn, at step 103 (which may be executed as the movement is detected 102, i.e., simultaneously), the cursor is rendered on the touchscreen at an offset that is proportional to the detected movement. In this illustrative example, the offset is one-half of the length or distance traveled. Thus, when the finger has moved 1 inch of the 2 inch total movement, the cursor is rendered ½ inch away from the current position of the finger, and when the finger has moved 2 inches, the cursor is rendered 1 inch away from the then current position of the finger.

According to an embodiment of the method 100, rendering display 103 of the cursor in the GUI comprises continuously displaying the cursor throughout the detected movement. In such an embodiment, the continuously displayed cursor is displayed at an offset that is proportional to the total accumulated length traveled at each sample moment in time.

In embodiments, rendering display 103 of the cursor in the GUI includes continuously calculating a distance traveled throughout the movement from an identified point of initial contact and continuously displaying the cursor throughout the detected movement. In such an embodiment, the offset distance is a function of the continuously calculated distance traveled. Thus, in such an embodiment, the cursor is displayed at an offset that is away from the position of current contact and that is a proportion of the total accumulated length or distance traveled thus far from initial contact.

Further, in yet another embodiment of the method 100, the offset distance is a function of the continuously calculated distance until the offset distance is equal to a predefined threshold referred to herein as an offset distance cap or maximum. To illustrate, returning to the aforementioned finger example, the offset is one-half of the length/distance traveled, and a cap (threshold) is implemented that is 1 inch. In such an example embodiment, the finger moves along the screen surface a total of 3 inches. Thus, when the finger has moved 1 inch of the 3 inch total movement, the cursor is rendered ½ inch away from the position of the finger at that time, and when the finger has moved 2 inches the cursor is rendered 1 inch away from the then position of the finger. However, after moving 2 inches and rendering the cursor 1 inch away from the then position of the finger, the cap has been reached. Thus, when the finger is moving along the screen surface a total accumulated distance of 2 to 3 inches from the initial point of contact, the offset is maintained at 1 inch away from a current position of the finger.

As discussed above, embodiments of the method 100 continuously display the cursor in the plane of the screen view at a location relatively above the position of the contact, from the perspective of a user performing the contact, as the contact travels/moves along the screen surface. In embodiments, the method 100 determines such display locations for the cursor as a function of or in relation to: (a) current position of the contact with the touch screen, and (b) one or more physical characteristics of the detected movement, such as speed or direction, for non-limiting example. In one embodiment, method 100/step 103 defines such display locations of the cursor as a function of: (i) the calculated offset distance away from the current position of the contact as described above with or without thresholding, and (ii) direction of the detected movement. In an embodiment, the direction is determined using a vector defined by the start point, i.e., initial point of contact, and the current point of contact. In such an embodiment, the cursor may be displayed at the same direction of this vector at the offset distance. For example, if the finger is moving up and to the right along the screen from the start position, e.g., in a North-Eastern direction, the cursor is displayed at the offset distance from the finger along the vector defined by the start point, i.e., initial point of contact, and current point of contact. In this example, the cursor will be shown above and also to the right of the finger, e.g., in a North-Eastern direction. In an embodiment, this behavior, i.e., displaying the cursor based on the direction, is employed when displaying the cursor near screen borders in the respective directions. As a result, the offset cursor will be able to reach all screen borders while the contact implement, i.e., finger, remains within the screen, never having to touch borders.

In an embodiment of the method 100, the movement detected at step 102 is a plurality of discrete movements along the touch screen. Step 102 sums the various lengths of the plurality of discrete movements into a single value, and Step 103 determines the offset using this single value. In such an embodiment, even if the finger/contact makes a very small zig-zag or circular motion around a point C1 (the point of initial contact) and the finger ends up again over C1, then Steps 102 and 103 calculate the offset as described above using accumulated distance traveled and render the cursor offset from the finger.

To illustrate, consider an example where the finger initially contacts the touch screen at point C1. In turn, the finger in contact with the screen surface moves along some trajectory, that can be up, down, straight, curvilinear, zig-zag, or looping around C1. During this movement, the trajectory is broken up into multiple discrete small movements, each having its own length and direction. If the direction of any such discrete movement is generally upward, then its length is added to an offset value. If the direction of the small movement is generally downward, then only half of its length is added to the offset value. The result is that if, for example, the finger moves from point C1 straight up to some point C2 (above C1 in relation to the perspective of a user) then the compound value of the offset would be equal to the vertical distance between C1 and C2. Conversely, if C2 is below C1 (in relation to the perspective of a user) the offset would be equal to half the vertical distance between C1 and C2. Further, such an embodiment may put a cap on the offset. If, for example, C2 is the point at which the offset value becomes fixed due to thresholding, the cursor is shown above the current position of the finger at a distance equal to the offset value.

In an embodiment, the direction for displaying the cursor may be based on a vector from the initial point of contact to the current point of contact. In such an embodiment, the cursor is displayed along the direction of the vector, but at the offset distance. For instance, if the finger moves directly up along the screen, the vector of movement is directly up, and the cursor is displayed directly above the finger at the offset distance. In embodiments, the cursor may be shown offset from the finger also horizontally, right, or left (or in any direction) depending on the general finger movement direction defined by a vector from the initial point of contact to the current point of contact. Further, in an embodiment, the consideration, i.e., use, of direction for displaying the cursor may change depending on the location of the contact on the screen. For instance, the magnitude of the shift in displaying the cursor caused by direction considerations may be variable, starting from small or none in the middle of the screen (cursor always shown above finger) and increasing near screen side borders, such that cursor can reach borders before the implement for contact reaches the border.

FIGS. 2A-D depict results of rendering display of a cursor 221 on a touch screen (or in a screen view thereof) 220 according to an embodiment where a finger contact moves upwardly 226 along the screen surface 250. In FIGS. 2A-D, the finger contact does not move horizontally and only moves upwardly 226 along the screen surface 250. In FIG. 2A, the contact 222a is the start position where a finger makes first contact with the touch screen 220. FIG. 2B illustrates where the finger contact slides by amount d 223a to position 222b. Using method 100, the cursor 221a (generally referenced 221) is rendered and appears moving ahead of the finger (which is currently at the position 222b) by calculated offset d1 224 which is proportional to d 223a. In FIG. 2C, the finger contact continues to move upward to position 222c where the finger contact is an accumulated distance d2 223b from the starting positioning 222a, and applying method 100, the offset from the then sampled position of the finger to the cursor 221b continues to elastically change proportionally (to accumulated distance travelled) until the offset reaches fixed (threshold) value D 225. In FIG. 2D, the finger contact continues to slide to position 222d in screen view 220 where the cursor 221c is kept at the same offset D 225 as in FIG. 2C. As such, the offset is now fixed at threshold value D 225, and method 100 displays the cursor 221 moving together with the finger contact until the finger is released (lifted) from the touch screen surface 250.

FIGS. 3A-D illustrate displaying an offset cursor 331 on a touch screen (screen view) 330 according to an embodiment where a finger contact moves downwardly 336 along screen surface 350. In FIGS. 3A-3D, the finger contact does not move horizontally and only moves downwardly 336 along the screen surface 350. In FIG. 3A, the contact 332a is the start position where a finger makes first contact with the touch screen 330. FIG. 3B illustrates where the finger contact slides by amount d 333 to position 332b. Using method 100, the cursor 331a (generally referenced 331) is rendered and appears moving behind the finger (which is currently at the position 332b) by offset d1 334 which is proportional to d 333. In FIG. 3C, the finger contact continues to move downward 336 to position 332c, and applying method 100, the offset from the then sampled position of the finger to the cursor 331b continues to elastically change proportionally (to accumulated distance traveled) until the offset reaches fixed (threshold) value D 335. In FIG. 3D, the finger contact continues to slide to position 332d in screen view 330, and the cursor 331c is kept at the same offset D 335 as in FIG. 3C. Thus, in such an embodiment, after the maximum offset is reached, the offset is fixed at threshold value D 335, and method 100 displays the cursor 331 moving together with the finger contact until the finger is released (lifted) from the touch screen surface 350.

Figure 4B:
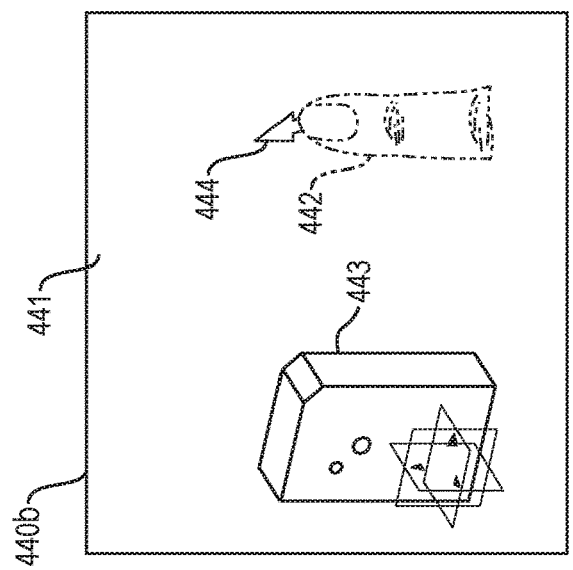
Figure 4C:
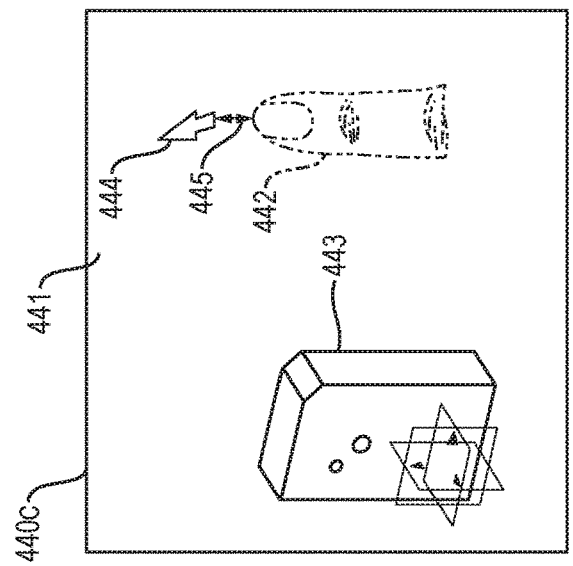

FIGS. 4A-C illustrate stages 440a-c of displaying a cursor 444 as a contact implement, i.e., finger, 442 moves upwardly along the surface of the touch screen 441, while the screen view of touch screen 441 displays a computer-aided design (CAD) model 443. That is to say, the CAD system embodies method 100. FIG. 4A illustrates the stage 440a of initial contact of the finger 442 on the planar surface of the touch screen 441 of a touch screen device. At this initial stage 440a, the cursor (not shown) is under the finger 442 and at a position coincident with position of the finger in the plane of the screen view. At the subsequent stage 440b depicted in FIG. 4B, the finger 442 moves up along the surface of touch screen 441 (in relation to the CAD system user facing the touch screen 441). As the finger 442 moves upwardly along the screen surface, the method/CAD system renders the cursor 444 so as to be depicted offset from the position of the finger contact 442. In the next stage 440c depicted in FIG. 4C, the finger 442 has continued to move up along the screen surface of the touch screen 441. In response, CAD system/method 100 increases the offset 445 between the moving finger 442 and the rendered display of the cursor 444. Specifically, CAD system/method 100 increases the offset 445 proportionally in relation to the movement and accumulated distance traveled of the finger 442 from the position of the finger 442 at the stage 440a depicted in FIG. 4A, through the position of finger 442 at stage 440b depicted in FIG. 4B, to the position of the finger 442 at the stage 440c depicted in FIG. 4C.

Figure 5C:
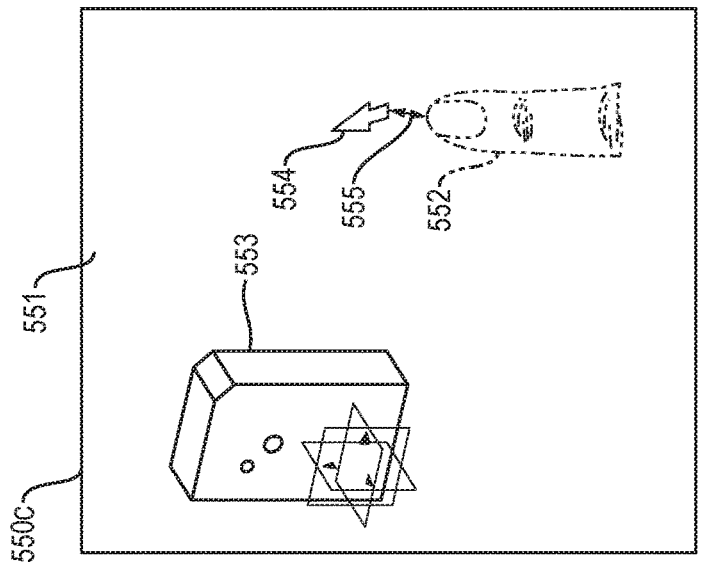
FIGS. 5A-C are schematic views that illustrate stages of displaying a cursor according to an embodiment as a contact implement moves downwardly along the surface of a touch screen device.
Figure 5B:
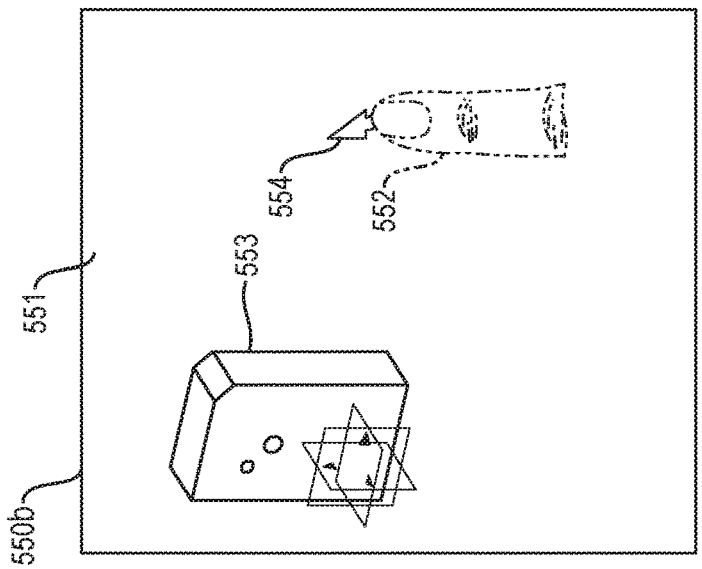
Figure 5A:
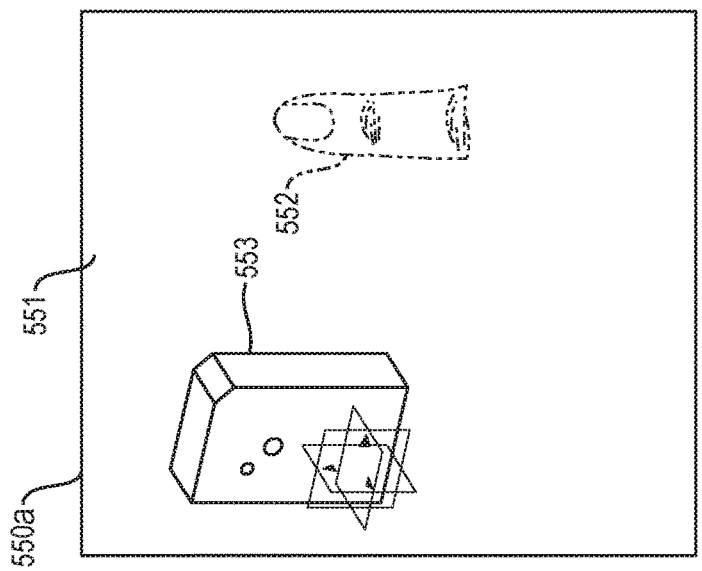

FIGS. 5A-C illustrate stages 550a-c of displaying a cursor as a contact implement, i.e., finger, 552 moves downwardly along the surface of the touch screen 551, while the screen view of touch screen 551 displays a CAD model 553. The CAD system embodies method 100. FIG. 5A illustrates the stage 550a of initial contact of the finger 552 on the planar surface of touch screen 551 of the touch screen device. At this initial stage 550a, the cursor (not shown) is under the finger 552 and at a position coincident with position of the finger in the plane of the screen view. At the subsequent stage 550b depicted in FIG. 5B, the finger 552 moves downwardly along the surface of touch screen 551 (in relation to a CAD user facing touch screen 551). As the finger 552 moves downwardly along the screen surface, the CAD system/method 100 renders the cursor 554 so as to appear from under the finger 552 and be depicted at an offset from the position of finger 552. In the next stage 550c illustrated in FIG. 5C, the finger 552 has continued to move down along the surface of the touch screen 551. In response, CAD system/method 100 increases the offset 555 between the moving finger 552 and the rendered display of the cursor 554. Specifically, CAD system/method 100 increases the offset 555 proportionally in relation to the movement and accumulated distance traveled of the finger 552 from the position of the finger 552 at the stage 550a depicted in FIG. 5A, through the position of finger 552 at stage 550b (FIG. 5B), to the position of the finger 552 at the stage 550c depicted in FIG. 5C.

Figure 6C:
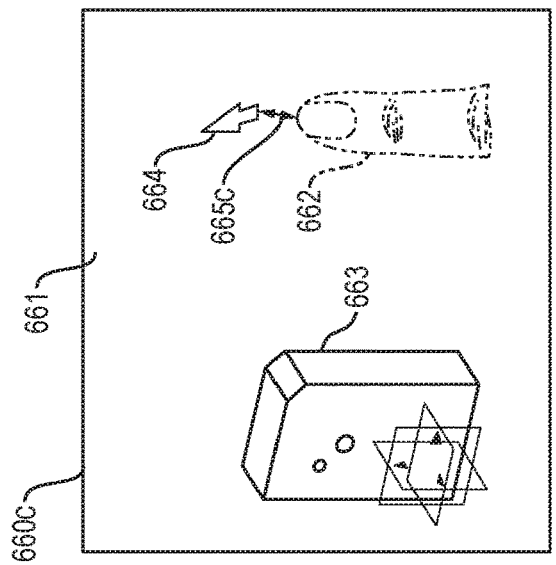
FIGS. 6A-E are schematic views that depict stages of displaying a cursor as a contact implement moves along the surface of a touch screen device in an embodiment.
Figure 6B:
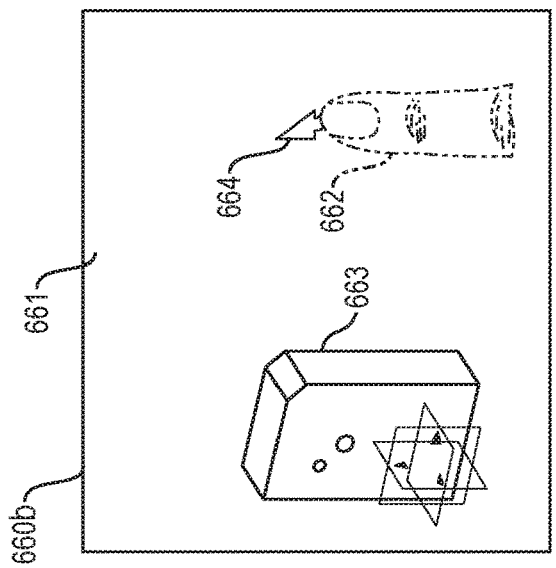
Figure 6A:
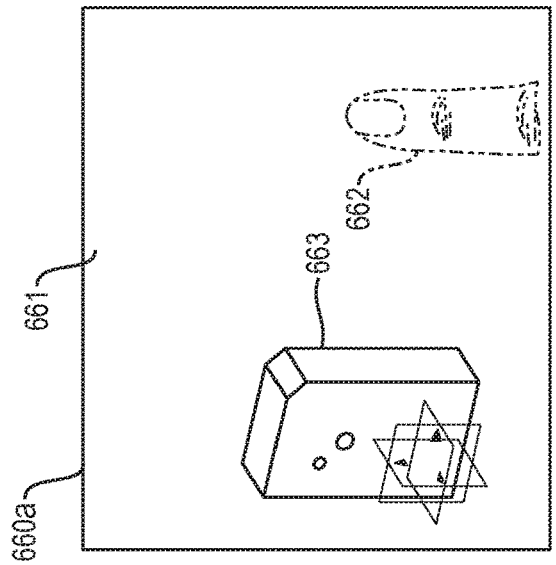
Figure 6E:
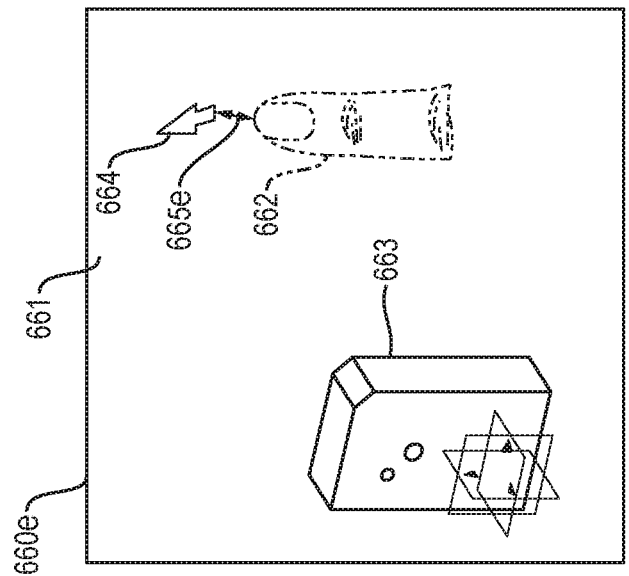
Figure 6D:
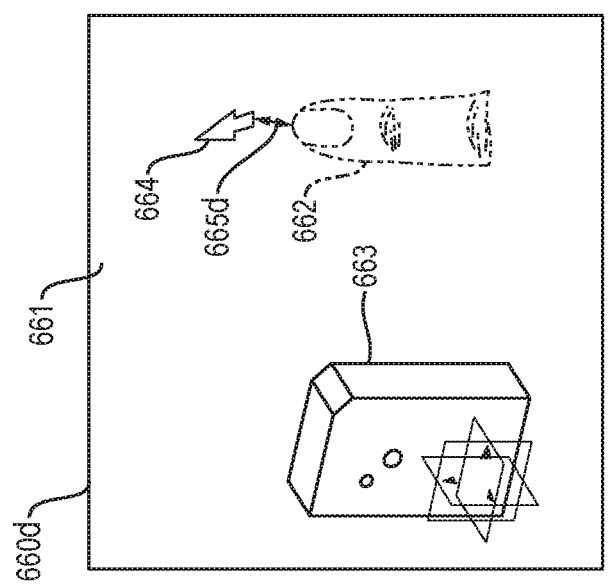

FIGS. 6A-E illustrate stages 660a-e of an embodiment displaying a cursor as a contact implement, i.e., finger, 662 moves upwardly along the surface of the touch screen 661 while the screen view of the touch screen displays a CAD model 663. The CAD system embodies method 100, and in this embodiment, there is a cap, i.e., maximum, placed on the offset between the position of the finger 662 and position of the cursor 664 as illustrated in the sequence of FIGS. 6A-6E. FIG. 6A illustrates the stage 660a where initial contact of the finger 662 on the surface of touch screen 661 occurs. At this initial stage 660a, the cursor (not shown) is under the finger 662 at a position coincident with position of the finger in the plane of the screen view. At the next in sequence stage 660b depicted in FIG. 6B, the finger 662 moves upwardly along the surface of the touch screen 661 (in relation to a user facing the touch screen 661). As the finger 662 moves up along the screen surface, CAD system/ method 100 renders the cursor 664 so as to be depicted offset from the positions of finger 662 contact. In the next stage 660*c* as shown in FIG. 6C, the finger 662 has continued to move upwardly along the surface of the touch screen 661. The CAD system/method 100 increases the offset 665*c* between positions of the moving finger 662 and positions of the rendered display of the cursor 664. In particular, CAD system/method 100 increases the offset 665*c* proportionally in relation to the movement of and accumulated distance traveled by the finger 662 from the beginning contact position of the finger 662 at the initial stage 660*a*, through the sequence of intermediate finger positions of stage 660*b*, to the position of the finger 662 at the stage 660*c*. At the stage 660*d* depicted in FIG. 6D, the finger 662 has moved along the screen surface further up the touch screen 661. CAD system/method 100 has eventually increased the offset 665*d* that lies between the position of finger 662 and the position of the cursor 664 to the predefined threshold value, i.e., the maximum offset. Thus, in the following stage 660*e* of FIG. 6E, where the finger 662 continues to move upwardly along the surface of touch screen 661, the offset 665*e* between the position of finger 662 and the position of cursor 664 is the same as the offset 665*d* at prior stage 660*d*.

In embodiments the cursor can be used to perform any cursor operations known in the art, such as selection and drawing for non-limiting example. Advantageously, by using embodiments in touch screen interfaces, selection tolerances and other graphical user-interaction tolerances, can be as tight as if using a mouse for cursor control, and there is no need to zoom in/out to make selections. Moreover, the user can choose tiny features using Applicant's offset cursor because the cursor is continuously visible (unobstructed by the contact implement).

Figure 7A:
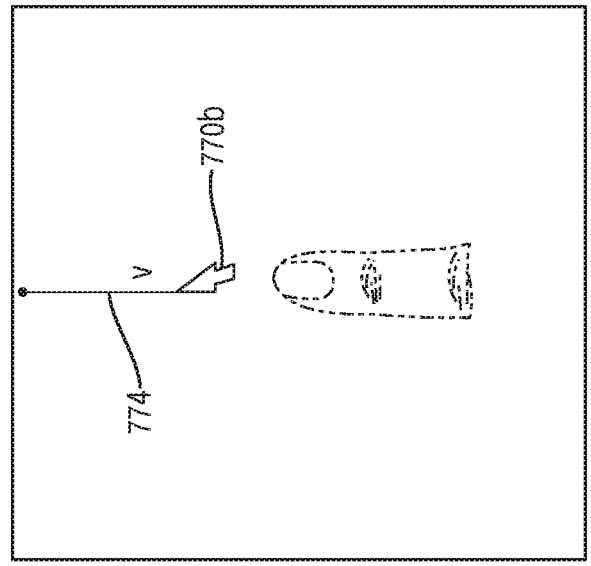
FIGS. 7A-7B are schematic views that demonstrate use of self-activating offset cursor embodiments.
Figure 7B:
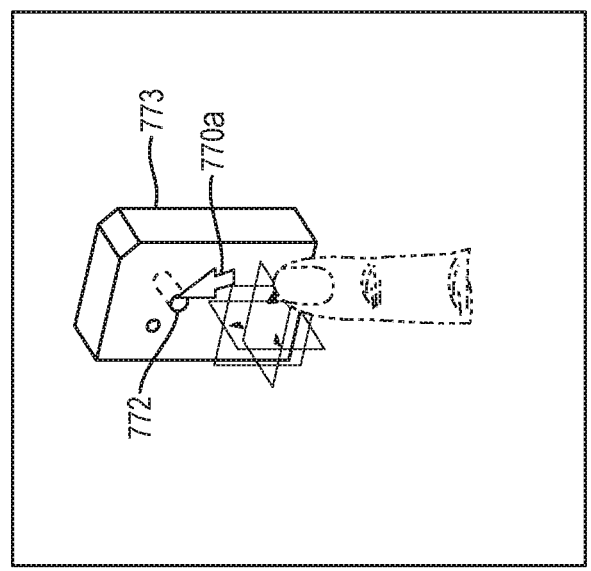

FIGS. 7A and 7B illustrate an offset cursor 770 following the principles of the present invention and use of the same on a touch screen in a CAD modeling application or similar environment. In particular, FIG. 7A demonstrates use of the offset cursor 770*a* to select a hole element 772 on the CAD model 773. To begin, the user touches the surface of the touch screen and navigates (moves) contact to CAD model 773. In response, CAD system/method 100 generates and interactively displays elastic offset cursor 770*a* in a fashion as described above in FIGS. 4A-4C, 5A-5C, and 6A-6E. With said displayed cursor 770*a*, the user points to and selects portions or elements of interest, such as hole 772, of CAD model 773. Known techniques are employed to implement user-interactive selection of displayed elements through the touch screen.

In another example, FIG. 7B demonstrates use of the offset cursor 770*b* to draw the line 774. To begin, the user touches the surface of the touch screen. Responsively the application system or touch screen device embodying method 100 generates and interactively renders elastic offset cursor 770*b* as previously described. With the displayed cursor 770*b*, the user interacts with and affects application tools, operations, menu options, and the like. One such operation is sketch drawing or similar line art composition where the cursor 770*b* draws lines 774 under user control, i.e., following the path of movement of the touch contact.

These and other operations carried out by touch screen I/O, mouse, or other cursor control devices can be similarly carried out by offset cursor 770 using common implementation techniques and technology. Applicant notes that FIGS. 7A-B demonstrate but two uses of embodiments. Embodiments are not limited to the functionality depicted in FIGS. 7A-B and embodiments described herein can be used to perform any cursor operations known in the art. Moreover, embodiments can be implemented in existing software suites. For instance, embodiments can be implemented to provide an offset cursor in graphic software products, e.g., CAD modeling tools, operating on touch platforms where improved selection and operation is desired.

Embodiments can be used in graphics software products, such as CAD software products, and can be used for interacting with manipulators and other CAD tools. Likewise, embodiments can be used for general selection, sketching, and drawing. Embodiments are useful for on-screen handles and manipulators that a user can pick and snap to geometry. These handles are typically zoom free and typically smaller than a finger. By employing embodiments of the present invention, a user can put a finger on such a handle and then simply drag and snap it to some geometry in one smooth move. This is possible because, by the time of snapping, the dragged handle will automatically shift from under the finger and become visible. This also provides useful visual user feedback for the underlying objects (edge, vertex, center etc.). Embodiments allow the user to see and snap the cursor.

In an embodiment, the method/systems disclosed herein generate the offset cursor so as to appear almost immediately after the point of contact (at the very location). In another embodiment, the cursor is interactively presented at a starting position off the tip of the finger making contact, which spares the user from having to visually search which way the offset cursor randomly went, as is required with prior art standard offset cursors. Because embodiments implement a cursor with a starting position at or closely adjacent to the point of contact, the cursor also allows users to perform a single click (tap) selection where applicable, e.g., for big or isolated objects, without having to slide her finger or turn an offset cursor on or off.

In an embodiment, the offset is based upon the distance traveled from an initial point of contact. One such embodiment continuously calculates this distance and the offset is a function of this distance traveled. Embodiments may also provide a cursor that is a function of distance traveled and direction traveled. For example, if the direction of a movement (i.e., a discrete portion of a movement path) is generally up (with respect to the user's perspective), the length of the generally upward movement is added to an offset value and if the direction of a movement is generally down (with respect to the user's perspective), only half of the length of the generally downward movement is added to the offset value. This resulting offset value, or a percentage thereof, i.e., 50%, can be used as the offset. According to another embodiment, the calculation of distance traveled is reset, i.e., set to zero, after an operation is performed. In other words, the offset distance starts from zero again after an operation is performed and the user touches the display again to perform another operation. According to an embodiment, the cursor is hidden from view after an operation is performed and the finger is removed from the touch screen. In such an embodiment, a next touch will re-display the cursor as described herein.

Figure 8:
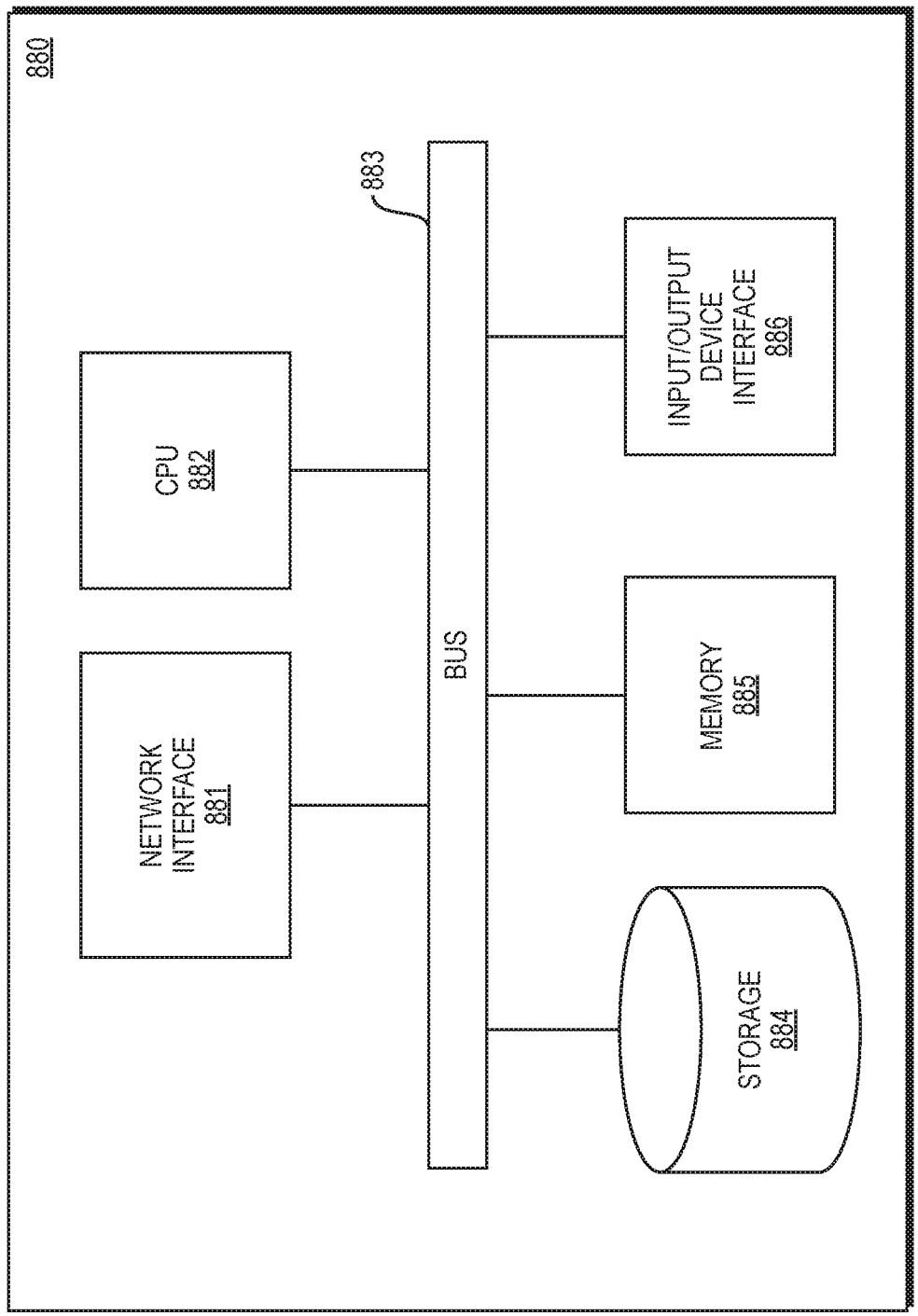
FIG. 8 is a simplified block diagram of a computer system for rendering display of a cursor according to an embodiment.

FIG. 8 is a simplified block diagram of a computer-based system 880 that may be used to display a cursor according to any variety of the embodiments of the present invention described herein. The system 880 comprises a bus 883. The bus 883 serves as an interconnect between the various components of the system 880. Connected to the bus 883 is an input/output device interface 886 for connecting various input and output devices such as a keyboard, mouse, touch screen, display, speakers, etc. to the system 880. A central processing unit (CPU) 882 is connected to the bus 883 and provides for the execution of computer instructions. Memory 885 provides volatile storage for data used for carrying out computer instructions. Storage 884 provides non-volatile storage for software instructions, such as an operating system (not shown). The system 880 also comprises a network interface 881 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 880, or a computer network environment such as the computer environment 990, described herein below in relation to FIG. 9. The computer system 880 may be transformed into the machines that execute the methods described herein, for example, by loading software instructions into either memory 885 or non-volatile storage 884 for execution by the CPU 882. One of ordinary skill in the art should further understand that the system 880 and its various components may be configured to carry out any embodiments or combination of embodiments of the present invention described herein. Further, the system 880 may implement the various embodiments described herein utilizing any combination of hardware, software, and firmware modules operatively coupled, internally, or externally, to the system 880.

Figure 9:
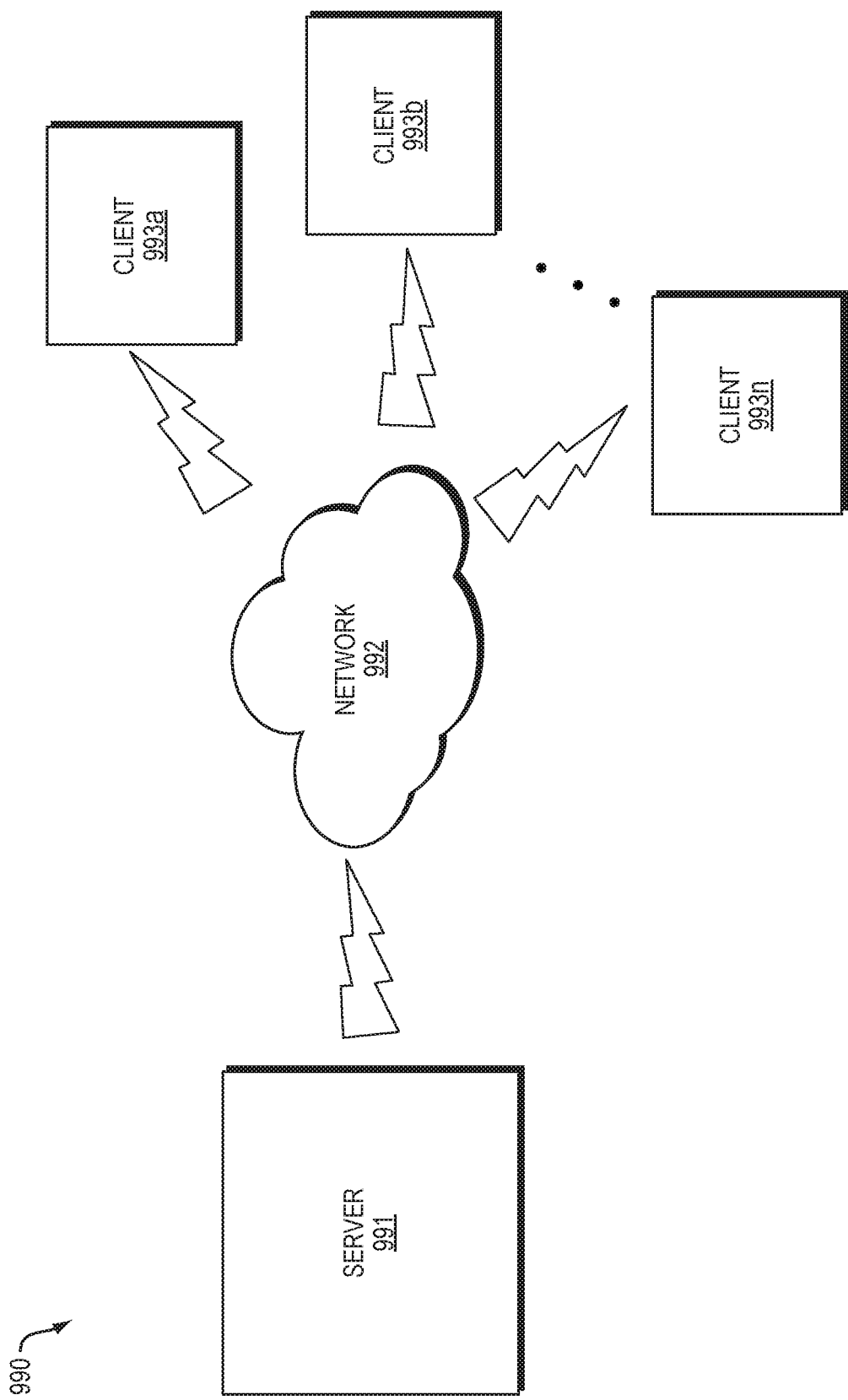
FIG. 9 is a simplified diagram of a computer network environment in which an embodiment of the present invention may be implemented.

FIG. 9 illustrates a computer network environment 990 in which an embodiment of the present invention may be implemented. In the computer network environment 990, the server 991 is linked through the communications network 992 to the clients 993a-n. The environment 990 may be used to allow the clients 993a-n, alone or in combination with the server 991, to execute any of the embodiments described herein. For non-limiting example, computer network environment 990 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer implemented method for displaying a cursor, the method comprising:
identifying contact with a screen of a touch screen device at an initial position on the screen;
detecting movement of the identified contact from the initial position through a succession of two or more positions on the screen; and
in response to detecting the movement of the identified contact:
continuously calculating a distance traveled throughout the movement from the identified contact at the initial position; and
continuously rendering display throughout the detected movement, at an offset distance away from current position of the contact, of a cursor in a graphical user interface (GUI) on the screen of the touch screen device, the offset distance of the displayed cursor away from the current position of the contact being a direct distance between the current position of the contact and the displayed cursor, wherein the direct distance is a function of the continuously calculated distance traveled until the direct distance is equal to an offset distance cap.

2. The method of claim 1 wherein the cursor is displayed at the offset distance away from the contact in a location in relation to the contact that is a function of direction of the detected movement.

3. The method of claim 1 wherein, in rendering display of the cursor in the GUI at the offset distance, the cursor is displayed above the identified contact in relation to a perspective of a user performing the contact.

4. The method of claim 1 wherein the cursor is configured to perform at least one of:
selection; and
drawing.

5. A system for displaying a cursor, the system comprising:
a processor; and
a memory with computer code instructions stored thereon, the processor and the memory, with the computer code instructions, being configured to cause the system to:
identify contact with a screen of a touch screen device at an initial position on the screen;
detect movement of the identified contact from the initial position through a succession of two or more positions on the screen; and
in response to detecting the movement of the identified contact:
continuously calculate a distance traveled throughout the movement from the identified contact at the initial position; and
continuously render display throughout the detected movement, at an offset distance away from current position of the contact, of a cursor in a graphical user interface (GUI) on the screen of the touch screen device, the offset distance of the displayed cursor away from the current position of the contact being a direct distance between the current position of the contact and the displayed cursor, wherein the direct distance is a function of the continuously calculated distance traveled until the direct distance is equal to an offset distance cap.

6. The system of claim 5 wherein the cursor is displayed at the offset distance away from the contact in a location in relation to the contact that is a function of direction of the detected movement.

7. The system of claim 5 wherein, in rendering display of the cursor in the GUI at the offset distance, the processor and the memory, with the computer code instructions, are further configured to cause the system to:
display the cursor above the identified contact in relation to a perspective of a user performing the contact.

8. The system of claim 5 wherein the cursor is configured to perform at least one of:
selection; and
drawing.

9. A non-transitory computer program product for displaying a cursor, the computer program product executed by a server in communication across a network with one or more client and comprising:
a computer readable medium, the computer readable medium comprising program instructions which, when executed by a processor, causes the processor to:
identify contact with a screen of a touch screen device at an initial position on the screen;
detect movement of the identified contact from the initial position through a succession of two or more positions on the screen; and
in response to detecting the movement of the identified contact:
continuously calculate a distance traveled throughout the movement from the identified contact at the initial position; and
continuously render display throughout the detected movement, at an offset distance away from current position of the contact, of a cursor in a graphical user interface (GUI) on the screen of the touch screen device, the offset distance of the displayed cursor away from the current position of the contact being a direct distance between the current position of the contact and the displayed cursor, wherein the direct distance is a function of the continuously calculated distance traveled until the direct distance is equal to an offset distance cap.

10. The computer program product of claim 9 wherein the cursor is displayed at the offset distance away from the contact in a location in relation to the contact that is a function of direction of the detected movement.

11. The computer program product of claim 9 wherein, in rendering display of the cursor in the GUI at the offset distance, the program instructions, when executed by the processor, cause the processor to:
display the cursor above the identified contact in relation to a perspective of a user performing the contact.

* * * * *